No. 747,492. PATENTED DEC. 22, 1903.
W. W. SANDERS.
MOWER.
APPLICATION FILED SEPT. 26, 1903.
NO MODEL. 2 SHEETS—SHEET 2.
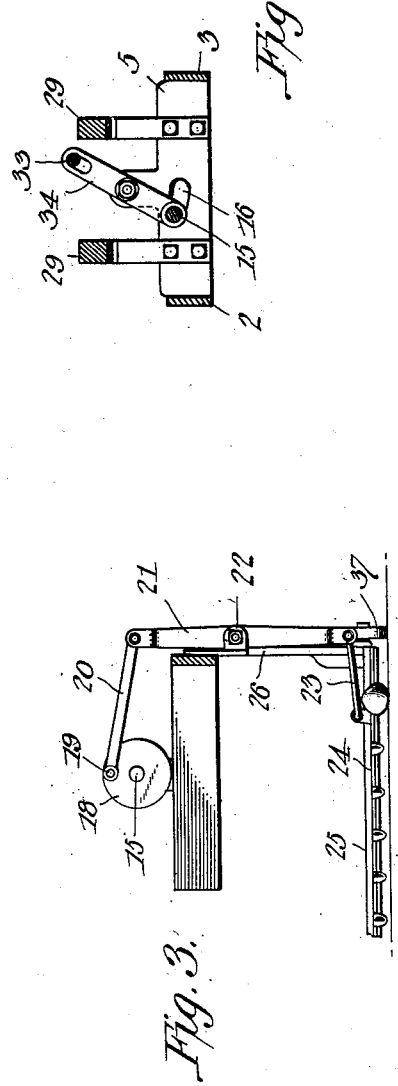
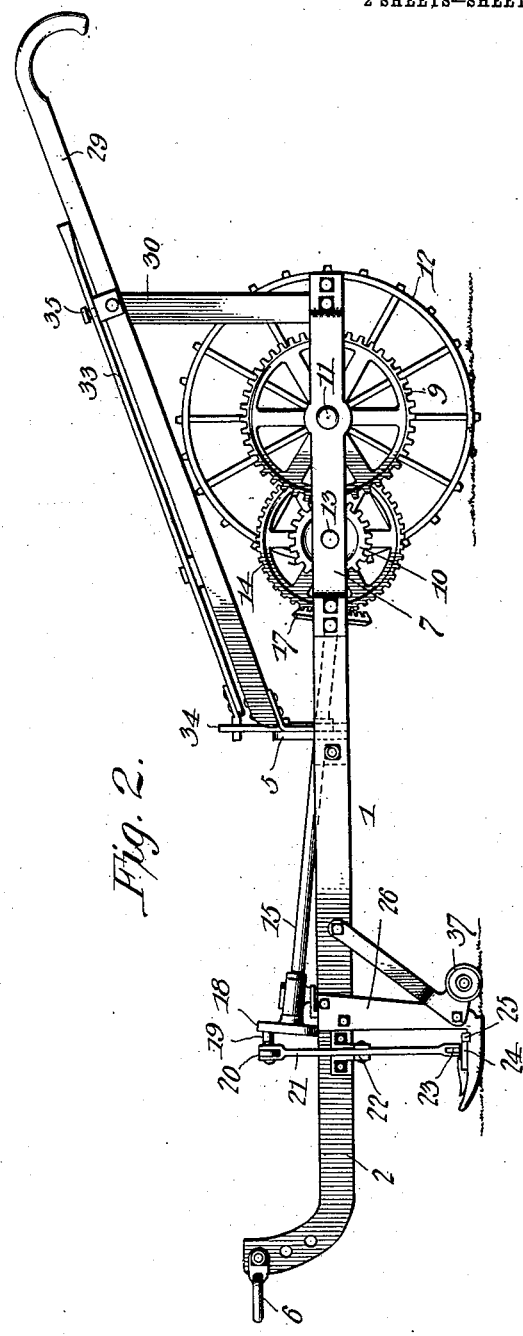
Witnesses
W. W. Sanders, Inventor.
by C. A. Snow & Co.
Attorneys No. 747,492. Patented December 22, 1903.

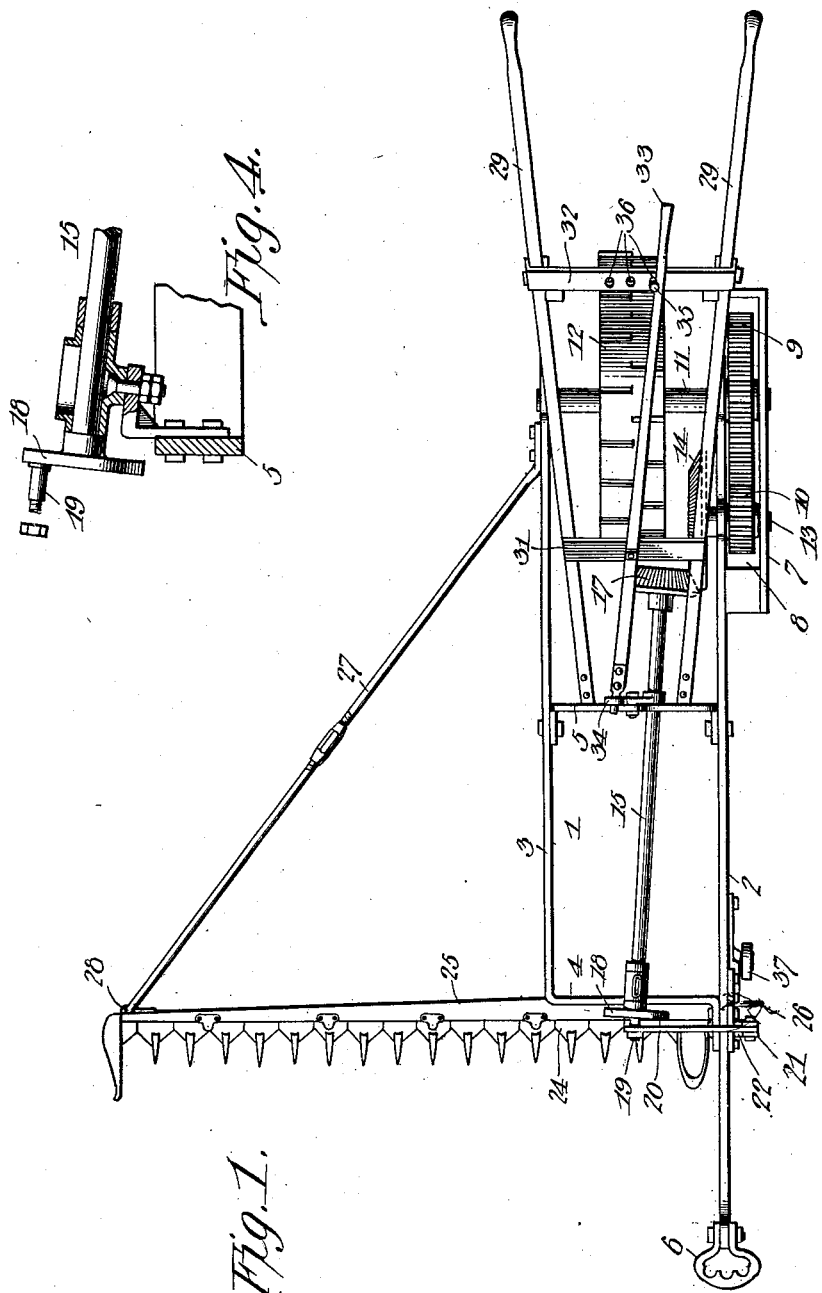

UNITED STATES PATENT OFFICE.

WILLIAM W. SANDERS, OF INDEPENDENCE, LOUISIANA.

MOWER.

SPECIFICATION forming part of Letters Patent No. 747,492, dated December 22, 1903.

Application filed September 26, 1903. Serial No. 174,818. (No model.)

*To all whom it may concern:*

Be it known that I, WILLIAM W. SANDERS, a citizen of the United States, residing at Independence, in the parish of Tangipahoa and State of Louisiana, have invented a new and useful Mower, of which the following is a specification.

My invention relates to mowing-machines, being especially designed for cutting weeds and grass between rows of plants, and has for its objects to produce a device of this character of simple construction which will be efficient in operation and one in which the cutter-bar may be thrown into and out of operation at will.

To these ends the invention comprises the novel details of construction and combination of parts more fully hereinafter described.

In the accompanying drawings, Figure 1 is a top plan view of a mower embodying my invention. Fig. 2 is a side elevation of the same. Fig. 3 is a front detail sectional elevation. Figs. 4 and 5 are detail views.

Referring to the drawings, 1 indicates the frame of the machine, composed of side bars 2 and 3, a front transverse connecting-bar 4, and an intermediate transverse bar or plate 5, disposed at the longitudinal center of the frame, the bar 2 being extended forwardly beyond the front bar or plate 4 and provided with a clevis 6, adapted for the attachment of the draft-animal.

7 designates a supplemental bar disposed parallel with and upon the outer face of the frame-bar 2, to which it is attached by bolts or otherwise, the bar 7 being maintained distant from bar 2 by suitable spacing-blocks, whereby a space or opening 8 is produced in which is arranged a pair of intermeshing gears 9 and 10. The gear 9 is fixed upon the main drive shaft or axle 11 of the machine, upon which is also fixed the ground-wheel 12, adapted in traveling over the ground to transmit motion to said gear 9. The gear 10 is fixed upon a counter-shaft 13, journaled for rotation in the frame and carrying at its inner end a bevel-gear 14, which is fixed upon the shaft and driven thereby from the ground-wheel through the medium of the gears 9 and 10, as will be readily understood.

15 is a driven or operating shaft extended centrally and longitudinally of the frame 1 and having bearing for rotation in the bars or plates 4 and 5, the bearing-opening in the latter plate being in the form of a horizontal slot 16, permitting a certain amount of lateral movement to the shaft for the purpose which will presently appear, there being fixed upon the rear end of the shaft a bevel-pinion 17, designed to mesh with the bevel-gear 14 for transmitting motion to the shaft.

Fixed upon the forward end of the shaft 15 is an eccentric head 18, carrying a wrist-pin 19, upon which is pivoted the inner end of a link 20, which is in turn pivoted at its outer end to the upper end of a rocking member or lever 21. The lever 21 is pivoted at its center in a bearing head or fork 22, attached to frame-bar 2, and is connected at its lower end by a link 23 to a reciprocatory knife or cutter-bar 24.

The cutter-bar 24 is adapted for longitudinal reciprocation in a guide 25, extending transversely of the machine and outward a suitable distance to the right of the latter. The guide is connected at its inner end to and sustained by a vertical standard 26, attached to and depending from the frame 1, while the outer end of the guide is sustained by a diagonal brace-rod 27, attached at its rear end adjacent to the rear end of longitudinal bar 3, and provided at its outer end with a vertically-depending portion 28, engaged with the guide-bar, which latter is provided with the usual teeth or fingers designed for coöperation with the knives of the cutter-bar 24 during operation of the latter.

29 indicates a pair of handles bolted or otherwise secured at their front ends to the transverse bar 5 and sustained adjacent to their rear ends by vertical standards 30, arising from the frame, these handles being connected at suitable points between their ends by transverse bars 31 and 32.

33 is a lever pivoted to the bar 31 and connected at its forward end with a rocking member 34, pivoted between its ends to plate 5 and provided at a point below its pivot with an opening through which the shaft 15 extends. The lever 33, which when operated serves through the medium of rocking member 34 to move the shaft laterally for bringing its pinion 17 into and out of gear with the gear-wheel 14, extends rearward to a point within easy reach of the operator and may be fixed in either its gearing or non-gearing positions by means of a pin 35, designed for insertion through any one of a series of openings 36, formed in the bar 32.

37 designates a small caster-wheel journaled for rotation at the lower end of a suitable frame or standard depending vertically from the side bar 2, this caster being designed to properly balance the frame and maintain the cutter-bar in its proper cutting position.

The operation, briefly, is as follows: Supposing the parts to be in operative position with the lever 33 thrown to the left, power will be transmitted from wheel 12 to shaft 15 through the medium of the intermediate gearing and the shaft will as it rotates serve through its eccentric head 18, link 20, and lever 21 to reciprocate bar 24. If, however, it is desired at any time to throw the bar 24 out of operation, lever 33 is moved to the right and locked in such position by the pin 35, thus throwing and maintaining the bevel-pinion 17 out of mesh with the bevel-gear 14.

From the foregoing it will be seen that I produce a device of simple construction which will be efficient in operation and one which is admirably adapted for the attainment of the ends in view. It is to be understood, however, that I do not limit myself to the precise details herein set forth, inasmuch as minor changes may be made therein without departing from the spirit of the invention.

Having thus described my invention, what I claim is—

1. In a mowing-machine, the combination with a frame, of an axle journaled therein, a ground-wheel fixed upon the axle, a driven shaft journaled for rotation in the frame, gear connections between the axle and shaft for driving the latter, the geared end of the shaft being movable transversely in its bearing, a cutter-bar, operative connections between the shaft and bar for operating the latter, a pivoted member engaging the shaft, and a lever connected with the member for actuating the latter to move the shaft transversely into and out of gear.

2. In a mowing-machine, the combination with a frame, of an axle journaled therein, a ground-wheel fixed upon the axle, a counter-shaft journaled in the frame and in gear connection with the axle, a bevel-gear fixed upon the counter-shaft, a driven shaft journaled for rotation in the frame, a bevel-pinion fixed upon the shaft and in mesh with the bevel-gear, the geared end of the driven shaft being movable transversely in its bearing, a reciprocatory cutter-bar, a rocking member operatively connected therewith, operative connections between the rocking member and driven shaft, a pivoted member engaging the driven shaft and operable for moving the latter transversely to throw its pinion into and out of mesh with the bevel-gear, and a lever for operating said member.

In testimony that I claim the foregoing as my own I have hereto affixed my signature in the presence of two witnesses.

WILLIAM W. SANDERS.

Witnesses:
M. A. DOLHOUDE,
J. B. COURMES.